(12) United States Patent
Liew et al.

(10) Patent No.: US 12,199,884 B2
(45) Date of Patent: Jan. 14, 2025

(54) METHOD AND A SYSTEM FOR NETWORK-ON-CHIP ARBITRATION

(71) Applicant: SKYECHIP SDN BHD, Pulau Pinang (MY)

(72) Inventors: Yeong Tat Liew, Pulau Pinang (MY); Yu Ying Ong, Pulau Pinang (MY); Soon Chieh Lim, Pulau Pinang (MY); Weng Li Leow, Pulau Pinang (MY); Chee Hak Teh, Pulau Pinang (MY)

(73) Assignee: SKYECHIP SDN BHD, Bayan Lepas (MY)

( * ) Notice: Subject to any disclaimer, the term of this patent is extended or adjusted under 35 U.S.C. 154(b) by 225 days.

(21) Appl. No.: 18/064,988

(22) Filed: Dec. 13, 2022

(65) Prior Publication Data
US 2024/0163223 A1    May 16, 2024

(30) Foreign Application Priority Data

Nov. 11, 2022  (MY) .............................. 2022006385

(51) Int. Cl.
*H04L 47/62* (2022.01)
*H04L 47/6275* (2022.01)

(52) U.S. Cl.
CPC ........ *H04L 47/623* (2013.01); *H04L 47/6225* (2013.01); *H04L 47/6275* (2013.01)

(58) Field of Classification Search
CPC ............... H04L 47/623; H04L 47/6225; H04L 47/6275; H04L 49/109; H04L 41/0896; H04L 41/22; H04L 41/5003
See application file for complete search history.

(56) References Cited

U.S. PATENT DOCUMENTS

| | | | |
|---|---|---|---|
| 10,673,745 B2 | 6/2020 | Swarbrick et al. | |
| 2014/0204764 A1* | 7/2014 | Kumar | H04L 45/302 370/241 |
| 2019/0238453 A1* | 8/2019 | Swarbrick | H04L 47/24 |

* cited by examiner

*Primary Examiner* — Chris Parry
*Assistant Examiner* — Steven C Nguyen
(74) *Attorney, Agent, or Firm* — ASLAN LAW, P.C.

(57) ABSTRACT

A method comprises the steps of receiving input from a user via user interface and selecting a plurality of flits from a plurality of ingress into a plurality of virtual channels followed by selecting the flits from the virtual channels into a plurality of egress based on the input from the user. The selection of the flits into the virtual channels and the egress characterized by the steps of computing default and elevated bandwidths of the virtual channels, computing default and elevated weights of the virtual channels based on the default and elevated bandwidths and generating a weightage lookup table using the default and elevated weights to perform arbitration weightage lookup for the flits with default and elevated priority levels for selecting the flits into the virtual channels and the egress, wherein the flits from the different ingress comprise different default and elevated weight.

7 Claims, 8 Drawing Sheets

METHOD AND A SYSTEM FOR NETWORK-ON-CHIP ARBITRATION

CROSS-REFERENCE TO RELATED APPLICATIONS

This application claims priority to MY Patent Application No. PI2022006385 filed on Nov. 11, 2022, the entire contents of which are hereby incorporated by reference.

TECHNICAL FIELD

The present invention relates generally to Quality of Service (QoS) implementation in a network-on-chip (NoC). More particularly, the present invention relates to a method and a system for NoC arbitration based on QoS implementation.

BACKGROUND ART

NoC is responsible for transmitting information packetized into smaller data size namely flow control unit (flit) from one end to the other end. When there is more than one ingress link into a router, arbitration logic is required for selection of the outgoing egress flit. The outgoing egress flit is selected based on QoS implementation to ensure better traffic flow for flit transmission across the NoC.

Numerous efforts have been made to provide QoS implementation in NoC arbitration to avoid congestion of flit transmission across the NoC. Some of the efforts are discussed in the following references.

US20140204764A1 discloses a method and a system for computing weights for various channels in a NoC based on the bandwidth requirements of flows at the channels and using the computed weights to perform weighted arbitration between channels in the NoC to provide QoS.

U.S. Ser. No. 10/673,745B2 discloses end-to-end QoS in a NoC, particularly a method of generating a configuration for the NoC. The method comprises the steps of receiving traffic flow requirements for a plurality of traffic flows, assigning routes through the NoC for each traffic flow based on the traffic flow requirements, determining arbitration settings for the traffic flows along the assigned routes, generating programming data for the NoC and loading the programming data to the programmable device to configure the NoC.

The aforementioned references and other relevant solutions may strive to provide improved congestion control for flits transmission across the NoC. Nevertheless, they still have a number of limitations and shortcomings. For example, they do not provide a solution to tackle NoC arbitration that involves combination of different priority levels within the same router virtual channel due to priority elevation of the flits.

Accordingly, there remains a need to provide a method and a system for NoC arbitration, particularly handling the router arbitration which involves combination of different priority levels.

SUMMARY OF THE INVENTION

The following presents a simplified summary of the invention in order to provide a basic understanding of some aspects of the invention. This summary is not an extensive overview of the invention. Its sole purpose is to present some concepts of the invention in a simplified form as a prelude to the more detailed description that is presented later.

It is an objective of the present invention to provide a method which can handle NoC arbitration involving combination of different priority levels.

It is also an objective of the present invention to provide a method which can assist in optimizing routing in the NoC based on user's input.

It is further an objective of the present invention to provide a system which is capable of buffering the flits and ensuring uninterrupted flit transmission across the NoC.

It is yet another objective of the present invention to provide a system which allows reconfigurable of QoS implementation in NoC arbitration.

Accordingly, these objectives may be achieved by following the teachings of the present invention. The present invention relates to a method for network-on-chip arbitration. The method comprises the steps of receiving input from a user via user interface and selecting a plurality of flits from a plurality of ingress into a plurality of virtual channels followed by selecting the flits from the virtual channels into a plurality of egress based on the input from the user. The selection of the flits into the virtual channels and the egress characterized by the steps of computing default and elevated bandwidths of the virtual channels, computing default and elevated weights of the virtual channels based on the default and elevated bandwidths and generating a weightage lookup table using the default and elevated weights to perform arbitration weightage lookup for the flits with default and elevated priority levels for selecting the flits into the virtual channels and the egress, wherein the flits from the different ingress comprise different default and elevated weight.

The present invention also relates to a system for network-on-chip arbitration. The system comprises a global order buffer module for storing the plurality of flits from the plurality of ingress, tracking the flits destination in the plurality of virtual channels and the plurality of egress, and buffering the flits. The system also comprises a linked-list managing module for managing a linked-list tracking of the egress, wherein the flits going into the same virtual channel of the same egress are stitched in the same linked-list. The system also comprises at least one priority tracker module for recording priority levels of the flits and assigning the flits from the same linked-list to exit the global order buffer module into the virtual channels and the egress, wherein the global order buffer module, the linked-list managing module and the priority tracker module are configured in a router.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following text figures, with like reference numbers referring to like structures across the views, wherein.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modifications, equivalents and alternatives falling within the scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the words "a" or "an" mean "at least one" and the word "plurality" means one or more, unless otherwise mentioned. Where the abbreviations or technical terms are used, these indicate the commonly accepted meanings as known in the technical field.

The present invention is described hereinafter by various embodiments with reference to the accompanying drawings, wherein reference numerals used in the accompanying drawings correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the invention.

Referring to the drawings, the invention will now be described in more details.

The present invention relates to a method (100) for NoC arbitration. More particularly, the present invention relates to a computer-implemented method (100) for NoC arbitration based on QoS implementation.

Figure 1:
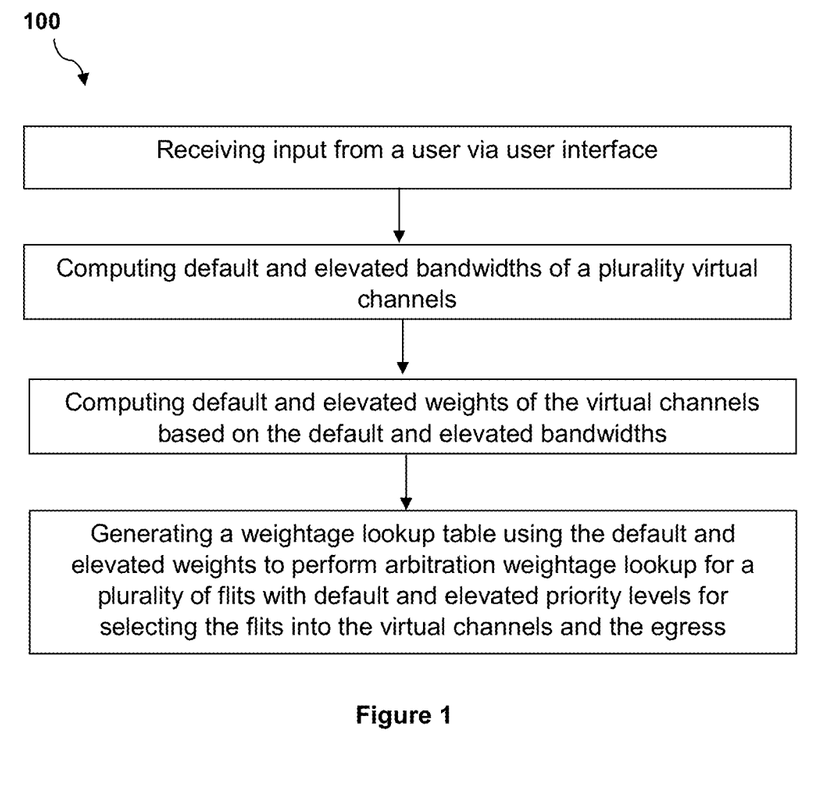
FIG. 1 is a flow diagram illustrating a computer-implemented method for NoC arbitration in accordance with an embodiment of the present invention.

FIG. 1 is a flow diagram illustrating the computer-implemented method (100) for NoC arbitration in accordance with an embodiment of the present invention. The computer-implemented method (100) comprises the steps of receiving input from a user via user interface and selecting a plurality of flits from a plurality of ingress into a plurality of virtual channels followed by selecting the flits from the virtual channels into a plurality of egress based on the input from the user. The selection of the flits into the virtual channels and the egress characterized by the steps of computing default and elevated bandwidths of the virtual channels, computing default and elevated weights of the virtual channels based on the default and elevated bandwidths and generating a weightage lookup table using the default and elevated weights to perform arbitration weightage lookup for the flits with default and elevated priority levels for selecting the flits into the virtual channels and the egress, wherein the flits from the different ingress comprise different default and elevated weight.

In accordance with an embodiment of the present invention, the user needs to provide the setup of the QoS implementation. The input from the user comprises node data bandwidth, node bandwidth allocation and direction, node priority level allocation, priority virtual channel mapping, priority level multiplier and maximum weight. Upon receiving the input from the user, the optimized result for routing path and priority level arbitration weight are computed to configure the NoC.

In accordance with an embodiment of the present invention, the computer-implemented method (100) comprises at least one priority level. The computer-implemented method (100) preferably but is not limited to comprise four priority levels. More particularly, the QoS implementation is feasible to support more than four priority levels.

In accordance with an embodiment of the present invention, the computer-implemented method (100) comprises deficit interleaved weighted round-robin arbitration. More particularly, the QoS implementation uses deficit interleaved weighted round-robin arbitration and support multi-cycles flits. The multi-cycle flits must be granted in a continuous manner where other single-cycle or multi-cycle flits must not interrupt the existing multi-cycle flits. In other words, the flits allocation allows sending number of multi-cycle flits greater than the defined weight. The weight counter will enter negative domain after subtracting the flits number and the negative value from the subtraction offsets during a weight counter refresh process. Under such circumstance, the weight counter will take few refresh-cycles to return to positive domain and restart the flits allocation.

In accordance with an embodiment of the present invention, the arbitration logic uses incoming priority level to perform lookup on the arbitration weight of the flits. The arbitration weight per priority level is computed for each arbitration point of every router when performing the routing path optimization. The weightage lookup table comprises the default weight for the priority level of the virtual channel and the elevated weight for elevated priority level case. When all the weights are utilized, only left the ingress flits with zero or negative counter value, or no incoming ingress flits, the weightage lookup table will be used in the weight counter refresh process to perform arbitration weightage lookup for the flits with default and elevated priority levels.

Figure 2:
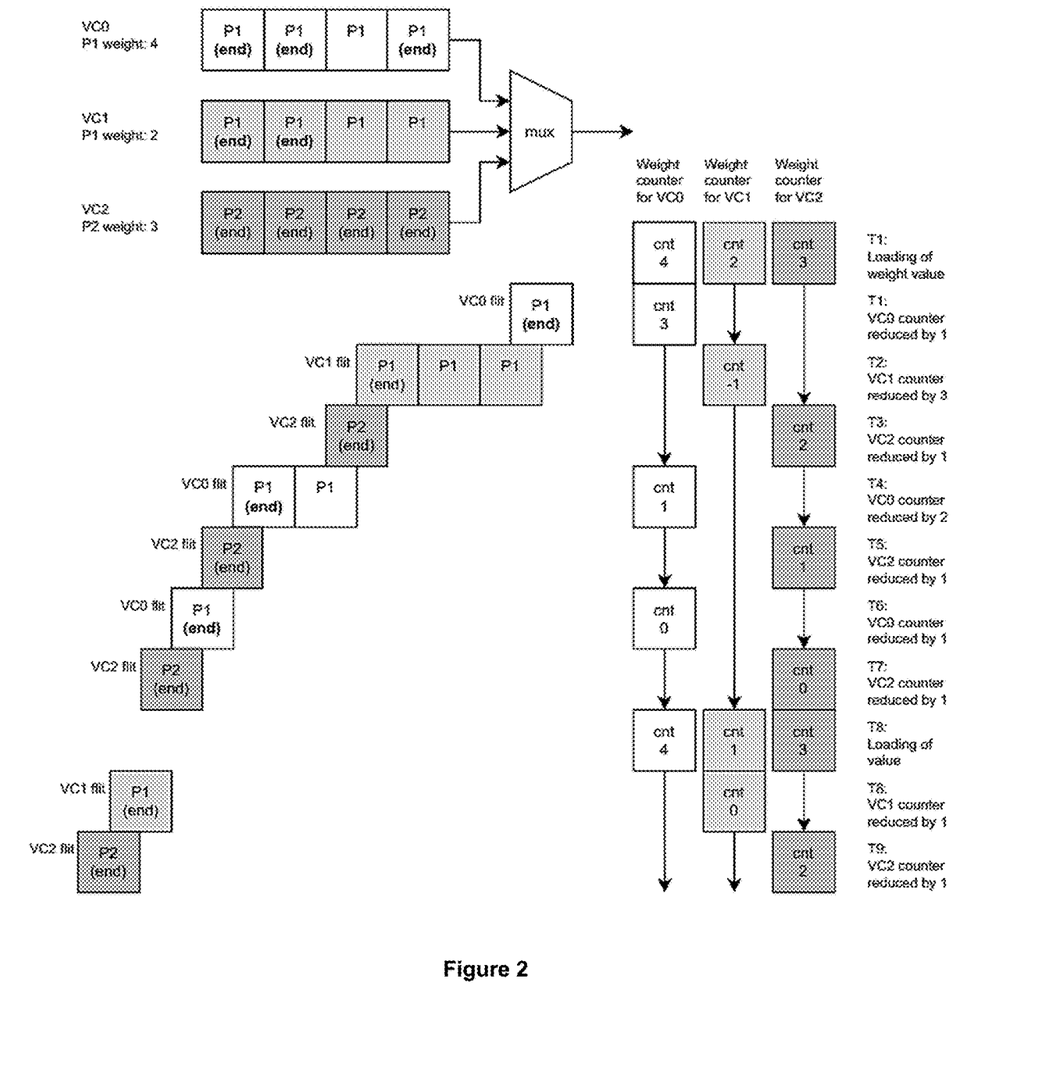
FIG. 2 is a diagram illustrating the flow of deficit interleaved weighted round-robin arbitration implementation for multi-cycle flits.

FIG. 2 is a diagram illustrating the deficit interleaved weighted round-robin arbitration for multi-cycle flits. The incoming flits consists of three multi-cycle flits from source VC0, two multi-cycle flits from source VC1 and four muti-cycle flits from source VC2. The multi-cycle flit length is determined by the indication of the end signal and it could be just one cycle with the first flit accompanied by the end indication. At time of T1, all the weight counters are initialized with the lookup weights. The allocation follows the round-robin fashion and rotates among VC0, VC1 and VC2 based on associated weights. Notably, the weight counter for source VC1 enters negative domain at first round and result in blocking its flits from being allocated in the next two rounds until the weight counter refreshed back to positive domain at time T8. Such arbitration logic allows transmission of the flits exceed the allocation and payback later, eventually ending in fair usage among all sources.

Figure 3:
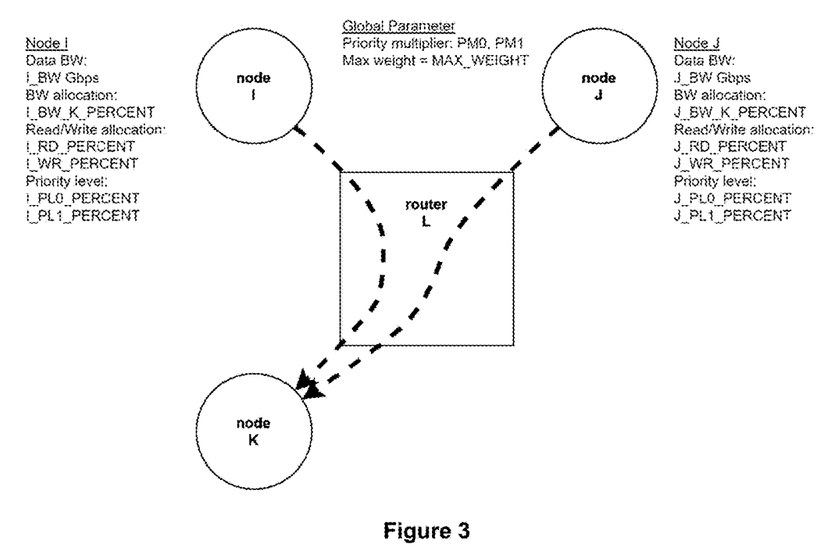
FIG. 3 is a diagram illustrating the setup of QoS implementation.

FIG. 3 is a diagram illustrating the setup of the QoS implementation. The parameters are defined by the user for router arbitration weight calculation.

To calculate the bandwidth (BW) allocated for each source-destination routing path, the default BW at each mapped virtual channel will be computed firstly then followed by any elevated case. The formula of the calculation of the default BW is as follows:

(source data $BW$)×(destination $BW$ percentage)×(read write percentage)×(priority percentage)×(default priority multiplier)

For elevated case, where the flits with different priority level mapping routed into current virtual channel due to requirement like transaction ordering, the formula of the calculation of elevated BW is as follows:

(source data $BW$)×(destination $BW$ percentage)×(read write percentage)×(priority percentage)×(elevated priority multiplier)

Next, the weight calculation will derive from the BW calculations above, per virtual channels in the router, the formula of the calculation of the default weight is as follows:

integer((default $BW$ of one node/(sum of default $BW$ from all node))×MAX_WEIGHT)

With the default weight, weight calculation for elevated case is as follows:

min(integer(elevated $BW$/default $BW$×default weight), MAX_WEIGHT)

The present invention will have the weightage lookup table comprises unique weightage for each default priority level and elevated case at each virtual channel. For example, the NoC in FIG. 3 comprises the default priority level mapping of both routing paths from node I-K and node J-K be PL0 and virtual channel VC0. Therefore, any flits from node I or node J with PL1 entering virtual channel VC0 will be treated as elevated case and use each unique elevated weightage value.

Figure 4:
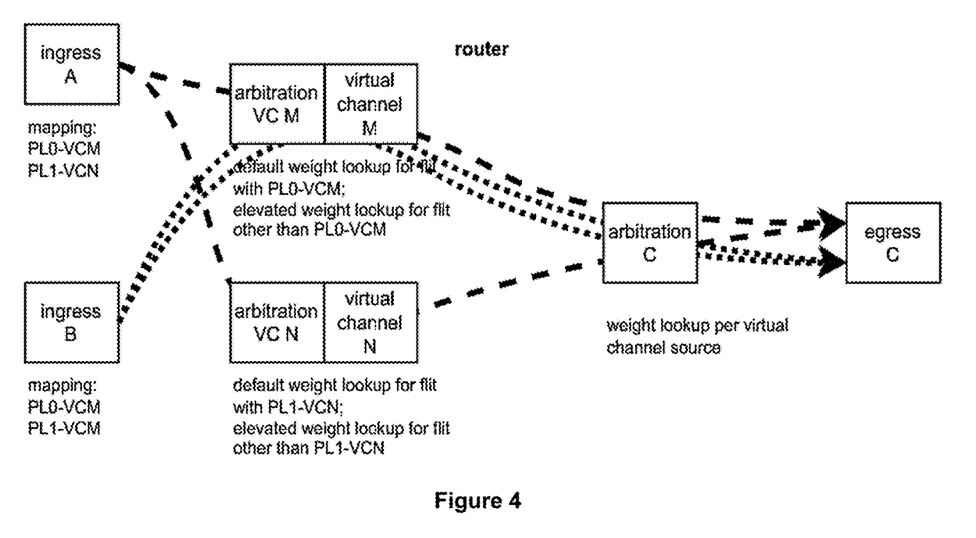
FIG. 4 is a diagram illustrating arbitration weightage lookup in a router using calculated weight.

FIG. 4 is a diagram illustrating the use of calculated weights to perform arbitration weightage lookup in the router. A simplified flit routing is provided where ingress A has the flit from source with priority virtual channel mapping of PL0 to VCM, PL1 to VCN, and ingress B has flit from source with mapping of both PL0 and PL1 to VCM. When more than one priority level is mapped to the same virtual channel, the configuration supports either flit with the lowest priority level or the smallest weightage to be the default and the rest of the flits will be treated as elevated case. Hence, with the configuration of PL0 as default for VCM and PL1 as default for VCN, there will be three default priority cases and three elevated cases.

The default cases are as follows:
ingress A has flit PL0 sending to virtual channel VCM
ingress A has flit PL1 sending to virtual channel VCN
ingress B has flit PL0 sending to virtual channel VCM
The elevated cases are as follows:
ingress A has flit PL1 sending to virtual channel VCM
ingress A has flit PL0 sending to virtual channel VCN
ingress B has flit PL1 sending to virtual channel VCM For the default cases, each flit has its own weightage calculated from the aforementioned formulas. Same for the elevated cases, the flit from different ingress will have different elevated priority level and weightage calculated from the aforementioned formulas.

The present invention also relates to a computer program product.

In accordance with an embodiment of the present invention, the computer program product comprising a non-transitory computer readable medium having a computer readable program embodied therein, wherein the computer readable program, when executed on a computing device, causes the computing device to receiving input from the user via user interface and computing default and elevated bandwidths of the plurality of virtual channels, computing default and elevated weights of the virtual channels based on the default and elevated bandwidths and generating the weightage lookup table using the default and elevated weights to perform arbitration weightage lookup for the plurality of flits with default and elevated priority levels for selecting the flits into the virtual channels and the plurality of egress.

The present invention further relates to a system (200) for NoC arbitration.

In accordance with an embodiment of the present invention, the system (200) comprises a global order buffer module (202) for storing the plurality of flits from the plurality of ingress, tracking the flits destination in the plurality of virtual channels and the plurality of egress, and buffering the flits. The system (200) also comprises a linked-list managing module (204) for managing a linked-list tracking of the egress, wherein the flits going into the same virtual channel of the same egress are stitched in the same linked-list. The system (200) also comprises at least one priority tracker module (206) for recording priority levels of the flits and assigning the flits from the same linked-list to exit the global order buffer module (202) into the virtual channels and the egress, wherein the global order buffer module (202), the linked-list managing module (204) and the priority tracker module (206) are configured in the router.

In accordance with an embodiment of the present invention, the system (200) further comprises a tracker module (208) configured in the node for ensuring the flits of the same transaction ordering are send through the same virtual channels regardless of the priority level.

Figure 5:
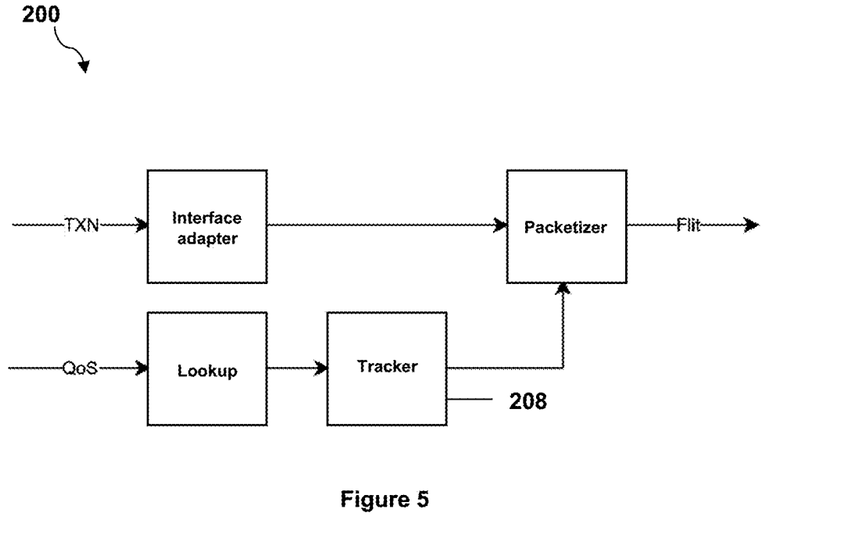
FIG. 5 is a diagram illustrating a system in a node interface in accordance with an embodiment of the present invention.

FIG. 5 is a diagram illustrating the system (200) in the node interface in accordance with an embodiment of the present invention. The flits will be sent via same router path for each source-destination pair but varies on the virtual channel per priority level. The flits with higher priority level will use virtual channel that is less congested than the flits with lower priority level. For certain transaction protocol that requires ordering, the tracker module (208) is configured in the node to ensure the flits of same transaction ordering are sent via the same virtual channels regardless of the corresponded priority level. Consequently, it leads to priority elevation of the flits in router arbitration due to combination of different priority levels within the same virtual channel. The node will packetize the transaction into flits together with the routing information (RINFO), which consist of the routing path for the router to forward the flits. With the QoS implementation of the present invention, the priority level will be part of RINFO of the flits and used in the router arbitration.

Figure 6:
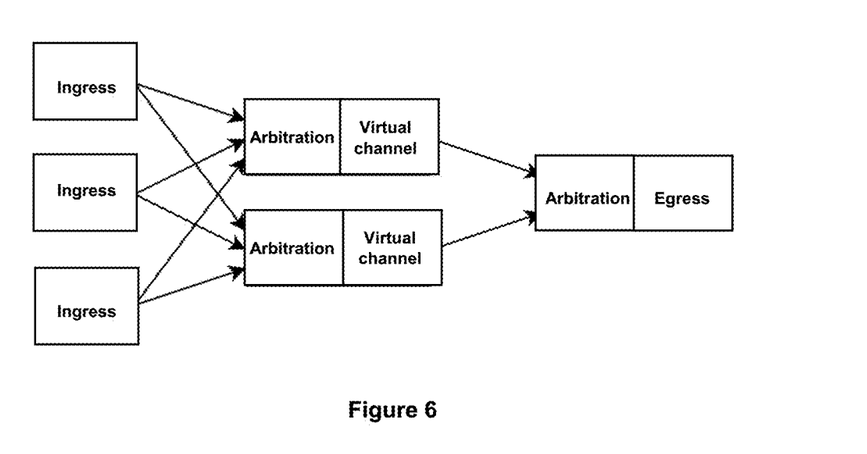
FIG. 6 is a diagram illustrating two-stage NoC arbitration in the router in accordance with an embodiment of the present invention.

FIG. 6 is a diagram illustrating the NoC arbitration in the router in accordance with an embodiment of the present invention. Basically, the router will handle the NoC arbitration in two stages. The first stage is to arbitrate between the flits from the different ingress into the virtual channel and the second stage is to arbitrate between the flits from the different virtual channels into the egress.

Figure 7:
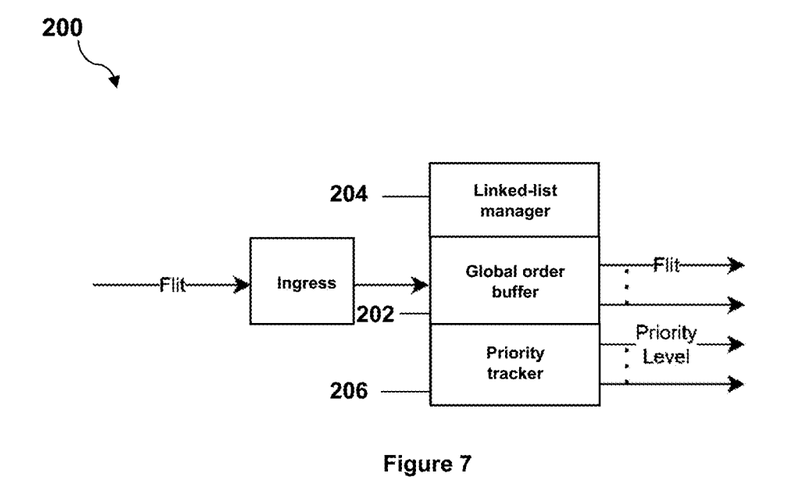
FIG. 7 is a diagram illustrating a system in the router ingress interface in accordance with an embodiment of the present invention.

FIG. 7 is a diagram illustrating the system (200) in the router ingress interface in accordance with an embodiment of the present invention. Each incoming flit from the ingress will be stored in a global order buffer module (202). The global order buffer module (202) keeps track of each flit destination on the virtual channel and the egress of the router. The global order buffer module (202) allows the ingress flits to be sent parallelly to all the egress destinations relative to FIFO first-in-first-out serialized output. Besides, the linked-list managing module (204) is configured in the system (200) to manage the flits linked-list tracking of all egress destinations. The flits going to the same egress destination including the flits from transaction ordering are stitched into the same linked-list to ensure that the flits are dispatched in order. Accordingly, it renders the global order buffer module (202) a single input multiple output buffer structure, where the flits targeting different virtual channels and egress could move out from the global order buffer module (202) without blocking each other. Moreover, the priority tracker module (206) is also configured in the system (200) to record the priority level of the flit per egress destination. The priority tracker module (200) will assign the flits within the same linked-list to exit the global order buffer module (202). The flit with highest priority level will elevate any flits in front to its elevated weight and thus the flits in front will exit the global order buffer module (202) sooner. In other words, the flits with lower priority level will have its priority elevated to a higher priority level in the next stage as long as it is ahead of the flits with higher priority level. As a result, the system (200) enables elevation of the flits with lower priority in path when sending the flits with higher priority across the NoC thereby allows the flits of lower priority to be pushed to the destination.

Figure 8:
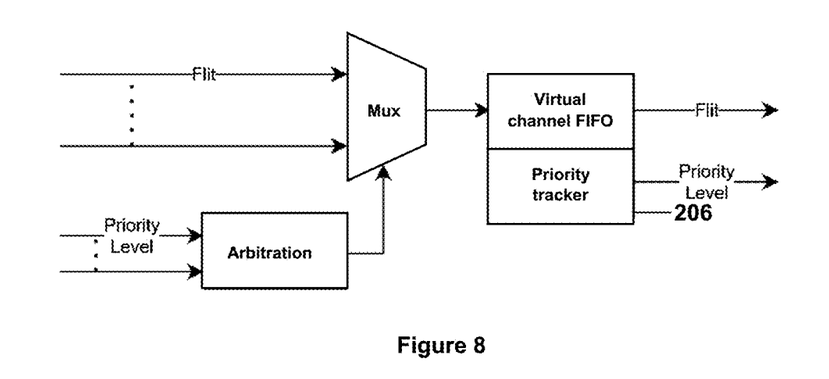
FIG. 8 is a diagram illustrating a system in the router virtual channel interface in accordance with an embodiment of the present invention.

FIG. 8 is a diagram illustrating the system (200) in the router virtual channel interface in accordance with an embodiment of the present invention. The virtual channel allows flits routing to share the same physical link but independent from each other. In the first stage arbitration, the flits are selected from the ingress as the ingress flit into the virtual channel FIFO in the router. The elevated priority level from the ingress interface will be applied in the arbitration logic here and the selected flit will be pushed into the virtual channel FIFO. Similar priority tracker module (206) as in the ingress interface is used in the virtual channel interface to select the flits to be sent from the virtual channel FIFO accompanied with the elevated priority level to the second stage arbitration.

Figure 9:
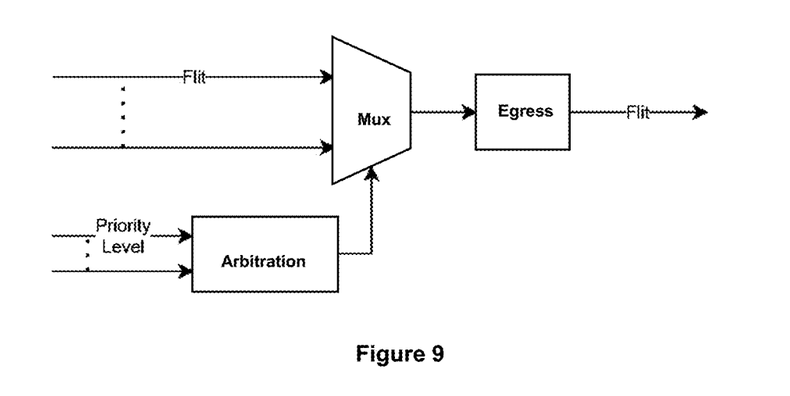
FIG. 9 is a diagram illustrating the system in the router egress interface in accordance with an embodiment of the present invention.

FIG. 9 is a diagram illustrating the system (200) in the router egress interface in accordance with an embodiment of the present invention. In the second stage arbitration, all the flits from the virtual channels will be arbitrated among all channels before selected into the egress as the egress flit. Thereafter, the egress flit will be sent to the next destination either the router or the node.

Hereinafter, examples of the present invention will be provided for more detailed explanation. The advantages of the present invention may be more readily understood and put into practical effect from these examples. However, it is to be understood that the following examples are not intended to limit the scope of the present invention in any ways.

Example 1

Figure 10:
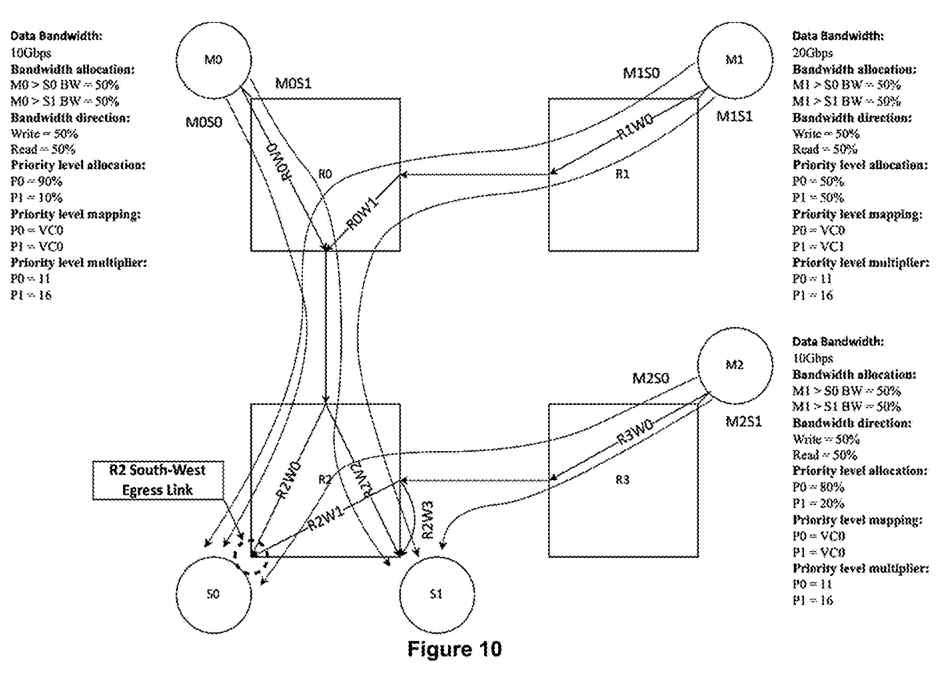
FIG. 10 shows an example of weight calculation for R2 south-west egress link in the NoC.

FIG. 10 is a diagram illustrating weight calculation for R2 south-west egress link. Notably, this example only shows weight calculation for VC0. VC1 is also follows the same calculation flow as shown below.

Total Bandwidth Calculation (for Write)

$$BW \text{ for } R2W0[VC0]=((M0S0 \text{ bandwidth})\times(M0S0 \text{ bandwidth allocation})\times(M0S0 \text{ write direction})\times(M0S0 \text{ P0allocation})\times(P0\text{multiplier}))+((M1S0 \text{ bandwidth})\times(M1S0 \text{ bandwidth allocation})\times(M1S0 \text{ write direction})\times(M1S0 \text{ P0allocation})\times(P0 \text{ multiplier}))=(10 \text{ Gbps}\times0.5\times0.5\times0.9\times11)+(20 \text{ Gbps}\times0.5\times0.5\times0.5\times11)=52.25 \text{ Gbps}$$

$$BW \text{ for } R2W1[VC0]=((M2S0 \text{ bandwidth})\times(M2S0 \text{ bandwidth allocation})\times(M2S0 \text{ write direction})\times(M2S0 \text{ P0 allocation})\times(P0 \text{ multiplier}))=(10 \text{ Gbps}\times0.5\times0.5\times0.8\times11)=22 \text{ Gbps}$$

Weight Calculation
Assuming max weight supported is 15.

$$\text{Weight for } R2W0[VC0]=\text{integer}(52.25/(52.25+22)\times15)=11$$

$$\text{Weight for } R2W1[VC0]=\text{integer}(22/(52.25+22)\times15)=4$$

M0 Send P1 Flit on VC0:

$$\text{Elevated } BW \text{ for } R2W0[VC0]=((M0S0 \text{ bandwidth})\times(M0S0 \text{ bandwidth allocation})\times(M0S0 \text{ write direction})\times(M0S0 \text{ P0 allocation})\times(P1 \text{ multiplier}))+((M1S0 \text{ bandwidth})\times(M1S0 \text{ bandwidth allocation})\times(M1S0 \text{ write direction})\times(M1S0 \text{ P0allocation})\times(P0 \text{ multiplier}))=(10 \text{ Gbps}\times0.5\times0.5\times0.9\times16)+(20 \text{ Gbps}\times0.5\times0.5\times0.5\times11)=63.5 \text{ Gbps}$$

BW for R2W1[VC0]=22 Gbps (No Change)

$$\text{Elevated Weight for } R2W0[VC0]=\min(\text{integer}(\text{Elevated } BW \text{ for } R2W0[VC0]/BW \text{ for } R2W1[VC0]\times\text{Weight for } R2W1[VC0]),\text{max weight})=\min(\text{integer}(63.5/22\times4),15)=12$$

M1 Send P1 Flit on VC0:

$$\text{Elevated } BW \text{ for } R2W0[VC0]=((M0S0 \text{ bandwidth})\times(M0S0 \text{ bandwidth allocation})\times(M0S0 \text{ write direction})\times(M0S0 \text{ P0 allocation})\times(P0 \text{ multiplier}))+((M1S0 \text{ bandwidth})\times(M1S0 \text{ bandwidth allocation})\times(M1S0 \text{ write direction})\times(M1S0$$

$P0\text{allocation})\times(P1\text{ multiplier}))=(10\text{ Gbps}\times0.5\times$
$0.5\times0.9\times11)+(20\text{ Gbps}\times0.5\times0.5\times0.5\times16)=64.75$
Gbps BW for R2W1[VC0]=22 Gbps(No Change)

Elevated Weight for $R2W0[VC0]$=min(integer(64.75/ 22×4),15)=12

Final Elevated Weight for $R2W0[VC0]$=integer(average(12,12))=12

M2 Send P1 Flit on VC0:

Elevated $BW$ for $R2W1[VC0]$=(($M2S0$ bandwidth)× ($M2S0$ bandwidth allocation)×($M2S0$ write direction)×($M2S0$ $P0$ allocation)×($P1$ multiplier))=(10 Gbps×0.5×0.5×0.8×16)=32 Gbps BW for R2W0[VC0]=52.25 Gbps (No Change)

Final Elevated Weight for $R2W1[VC0]$=min(integer (32/52.25×11),15)=7

Example 2

Figure 11:
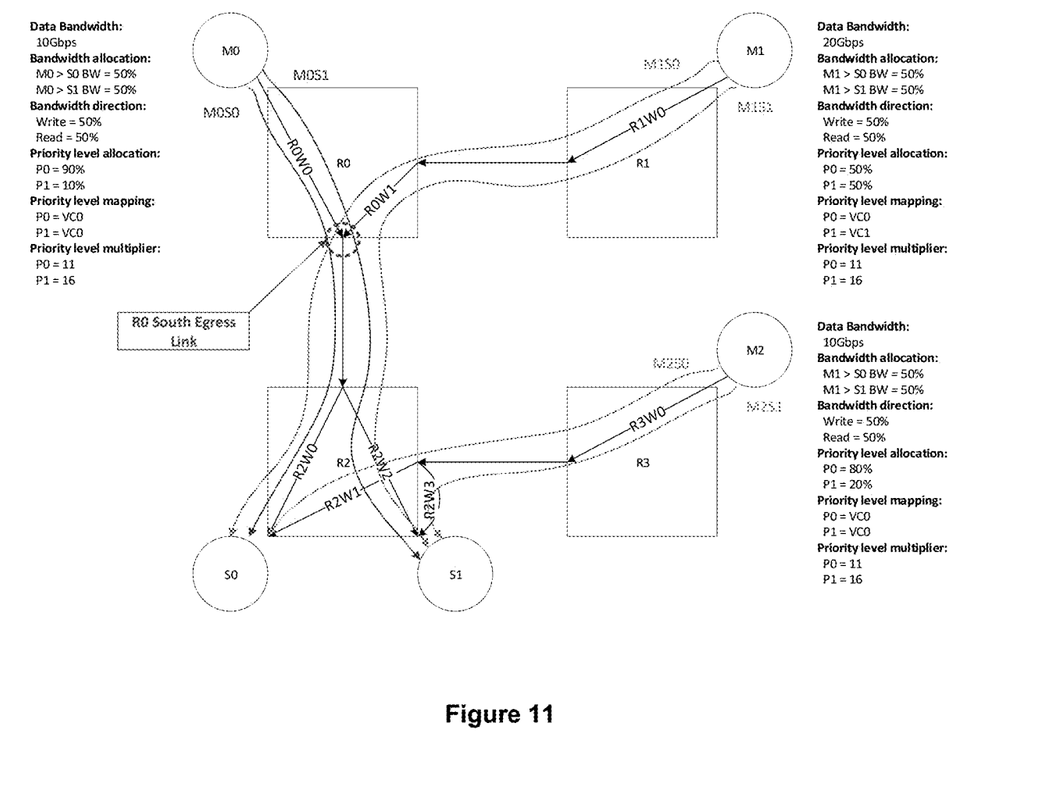
FIG. 11 shows an example of weight calculation for R0 south egress link in the NoC.

FIG. 11 is a diagram illustrating weight calculation for R0 south egress link, where P0 and P1 are both mapped to VC0, which is different from example 1. Notably, this example only shows weight calculation for VC0.
Total Bandwidth Calculation (for Write)

$P0BW$ for $R0W0[VC0]$, $P0$ bandwidth for $R0W0$
$VC0$=$M0S0$ bandwidth+$M0S1$ bandwidth=
(($M0S0$data bandwidth)×($M0S0$bandwidth allocation)×($M0S0$write direction)×($M0S0$ $P0$ allocation)×($P0$ multiplier))+(($M0S1$ data bandwidth)×($M0S1$bandwidth allocation)×($M0S1$ write direction)×($M0S1P0$ allocation)×($P0$ multiplier))=(10 Gbps×0.5×0.5×0.9×11)+(10 Gbps× 0.5×0.5×0.9×11)=49.5 Gbps $P1$ $BW$ for $R0W0[VC0]$, $P1$bandwidth for $R0W0$
$VC0$=$M0S0$ bandwidth+$M0S1$ bandwidth=
(($M0S0$ data bandwidth)×($M0S0$ bandwidth allocation)×($M0S0$ write direction)×($M0S0$ $P1$ allocation)×($P1$multiplier))+(($M0S1$ data bandwidth)×($M0S1$ bandwidth allocation)× ($M0S1$ write direction)×($M0S1$ $P1$ allocation)× ($P1$ multiplier))=(10 Gbps×0.5×0.5×0.1×16)+ (10 Gbps×0.5×0.5×0.1×16)=8 Gbps $BW$ for $R0W1[VC0]$=$M1S0$ bandwidth+$M1S1$ bandwidth=(20 Gbps×0.5×0.5×0.5×11)+(20 Gbps× 0.5×0.5×0.5×11)=55 Gbps(no change)

P1 will be chosen as the initial default priority level, as having the smallest bandwidth.
Weight Calculation Weight for $R0W0[VC0]P1$, weight for
$R0W0VC0P1$=integer(8/(8+55)×15)=2

Weight for $R0W1[VC0]P0$, weight for $R0W1$ $VC0$
$P0$=integer(55/(55+8)×15)=13

M1 Send P1 Flit on VC0:

Elevated $BW$ for $R0W1[VC0]$=(20 Gbps×0.5×0.5× 0.5×16)+(20 Gbps×0.5×0.5×0.5×16)=80 Gbps Elevated Weight Calculation Elevated Weight for $R0W0[VC0]P0$, weight for
$R0W0VC0$ $P0$=integer((49.5/55)×13)=12

Elevated Weight for $R0W1[VC0]P1$, weight for
$R0W1$ $VC0$ $P1$=integer((80/8)×2)=15

Example 3

Figure 12:
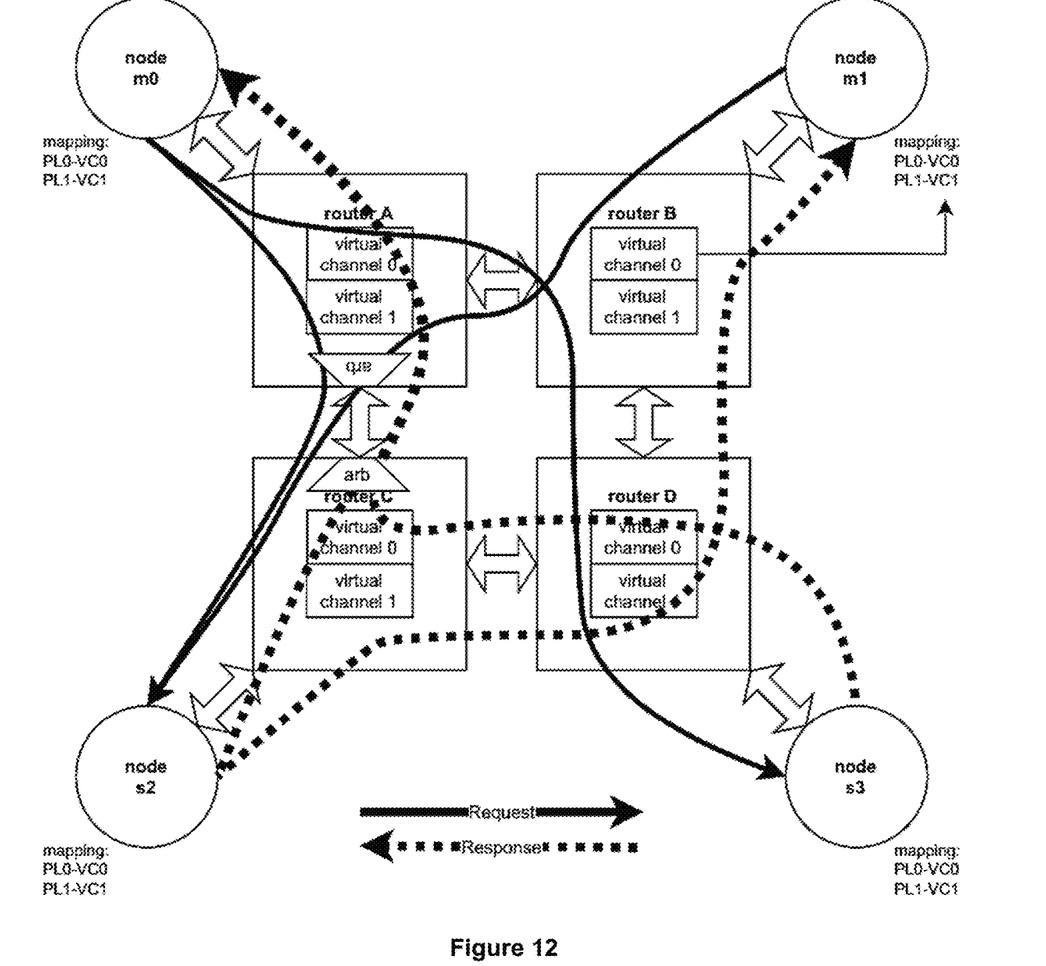
FIG. 12 shows an example of source-destination routings in the NoC with QoS implementation.

FIG. 12 is a diagram illustrating the NoC with QoS implementation which shows the source-destination routings for source node m0 and m1. The priority level and virtual mappings are configured with PL0-VC0 and PL1-VC1 for all nodes with the same priority level to virtual channel mapping, though the request flit and response flit could have different routing path. The configuration is set to have PL0 as default weightage.

Based on the routing as shown in FIG. 12, node m0 will access node s2 and s3, while node m1 only access node s2. Arbitration of virtual channel is still happened at each router. However, it does not need all the routers to arbitrate the flits from different source-destination path. It only requires the ingress-egress arbitration for router A egress to router C and router C egress to router A.

With the weight calculation flow as shown in examples 1 and 2, the arbitration weightage for all the flit arbitration is populated and start with the following source-destination path arbitration:
Router A virtual channel 0 to router C
   Request flit PL0 from m0 will have default weightage M0
   Request flit PL0 from m1 will have default weightage N0
   Request flit PL1 from either m0 or m1 will have elevated weightage EM0 or EN0
Router A virtual channel 1 to router C
   Request flit PL0 from m0 will have default weightage M1
   Request flit PL0 from m1 will have default weightage N1
   Request flit PL1 from either m0 or m1 will have elevated weightage EM1 or EN1
Router C virtual channel 0 to router A
   Response flit PL0 from s2 will have default weightage P0
   Response flit PL0 from s3 will have default weightage Q0
   Response flit PL1 from either m0 or m1 will have elevated weightage EP0 or EQ0
Router C virtual channel 1 to router A
   Response flit PL0 from s2 will have default weightage P1
   Response flit PL0 from s3 will have default weightage Q1
   Response flit PL0 from either s2 or s3 will have elevated weightage EP1 OR EQ1

For the flit arbitration of virtual channel-egress, the weightage will be derived from the source-destination path arbitration. If the router egress only used by single source-destination path, then the path arbitration weightage could be mapped directly as follows:
Router A virtual channel-egress to router B, Router B virtual channel-egress to router D, Router D virtual channel-egress to node s3
   Request flit PL0 from VC0 will have default weightage m0_s3_VC0
   Request flit PL0 from VC1 will have default weightage m0_s3_VC1
   Request flit PL1 from VC0 will have elevated weightage m0_s3_VC01

Request flit PL1 from VC1 will have elevated weightage m0_s3_VC10
Router D virtual channel-egress to router C
Response flit PL0 from VC0 will have default weightage s3_m0_VC0
Response flit PL0 from VC1 will have default weightage s3_m0_VC1
Response flit PL1 from VC0 will have elevated weightage s3_m0_VC01
Response flit PL1 from VC1 will have elevated weightage s3_m0_VC10
Router B virtual channel-egress to router A
Request flit PL0 from VC0 will have default weightage m1_s2_VC0
Request flit PL0 from VC1 will have default weightage m1_s2_VC1
Request flit PL1 from VC0 will have elevated weightage m1_s2_VC0 1
Request flit PL1 from VC1 will have elevated weightage m1_s2_VC10
Router C virtual channel-egress to router D, Router D virtual channel-egress to router B, Router B virtual channel-egress to node m1
Response flit PL0 from VC0 will have default weightage s2_m1_VC0
Response flit PL0 from VC1 will have default weightage s2_m1_VC1
Response flit PL1 from VC0 will have elevated weightage s2_m1_VC01
Response flit PL1 from VC1 will have elevated weightage s2_m1_VC10
Router A virtual channel-egress to router C, Router C virtual channel-egress to node s2
Request flit PL0 from VC0 will have default weightage m0m1_s2_VC0
Request flit PL0 from VC1 will have default weightage m0m1_s2_VC1
Request flit PL1 from VC0 will have elevated weightage m0m1_s2_VC01
Request flit PL1 from VC1 will have elevated weightage m0m1_s2_VC10
Router C virtual channel-egress to router A, Router A virtual channel-egress to node m0
Request flit PL0 from VC0 will have default weightage s2s3_m0_VC0
Request flit PL0 from VC1 will have default weightage s2s3_m0_VC 1
Request flit PL1 from VC0 will have elevated weightage s2s3_m0_VC01
Request flit PL1 from VC1 will have elevated weightage s2s3_m0_VC10

The application of deficit weighted round robin arbitration will ensure that over long period, each flit source will achieve minimal long term data rate ratio of (weight of one source)/(sum of weights). For example, under default scenario for Router A virtual channel 0 to router C, the data rate of the flit from m0 will be M0/(M0+N0)×BW.

The above-mentioned method (100) and system (200) overcome the problems and shortcomings of the existing solutions. For example, the method (100) of the present invention handles NoC arbitration involving combination of different priority levels within the same virtual channel. Further, the method (100) of the present invention provides arbitration weightage lookup during weight counter refresh process. Moreover, the system (200) of the present invention is capable to buffer the flits and ensure uninterrupted flit transmission across the NoC.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claim.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A computer-implemented method (100) for network-on-chip arbitration, the method (100) comprising the steps of:
   receiving input from a user via a user interface; and
   selecting a plurality of flits from a plurality of ingress into a plurality of virtual channels followed by selecting the flits from the virtual channels into a plurality of egress based on the input from the user;
   wherein selecting the flits into the virtual channels and the egress characterized by the steps of:
   computing default and elevated bandwidths of the virtual channels;
   computing default and elevated weights of the virtual channels based on the default and elevated bandwidths; and
   generating a weightage lookup table using the default and elevated weights to perform arbitration weightage lookup for the flits with default and elevated priority levels for selecting the flits into the virtual channels and the egress;
   wherein the flits are from different ingress and comprise different default and elevated weight, and
   wherein the method (100) comprises deficit interleaved weighted round-robin arbitration.

2. The computer-implemented method (100) for network-on-chip arbitration as claimed in claim 1, wherein the input from the user comprises node data bandwidth, node bandwidth allocation and direction, node priority level allocation, priority virtual channel mapping, priority level multiplier and maximum weight.

3. The computer-implemented method (100) for network-on-chip arbitration as claimed in claimed 1, wherein the method (100) comprises at least one priority level.

4. The computer-implemented method (100) for network-on-chip arbitration as claimed in claim 1, wherein the weightage lookup table is used in a weight counter refresh process.

5. A computer program product comprising a non-transitory computer readable medium having a computer readable program embodied therein, wherein the computer readable program, when executed on a computing device, causes the computing device to:
   receiving input from a user via a user interface;
   computing default and elevated bandwidths of a plurality of virtual channels;

computing default and elevated weights of the virtual channels based on the default and elevated bandwidths; and generating a weightage lookup table using the default and elevated weights to perform arbitration weightage lookup for a plurality of flits with default and elevated priority levels for selecting the flits into the virtual channels and a plurality of egress, wherein the flits are from different ingress and comprise different default and elevated weight, and wherein the computing device utilizes deficit interleaved weighted round-robin arbitration.

6. A system (200) for arbitrating network-on-chip comprising:
 a processor in communication with a memory storing instructions that when executed by the processor provide:
 a global order buffer module (202) for storing a plurality of flits from a plurality of ingress, tracking the flits destination in a plurality of virtual channels and a plurality of egress, and buffering the flits;
 a linked-list managing module (204) for managing a linked-list tracking of the egress, wherein the flits going into the same virtual channel of the same egress are stitched in the same linked-list; and
 at least one priority tracker module (206) for recording priority levels of the flits and assigning the flits from the same linked-list to exit the global order buffer module (202) into the virtual channels and the egress;
 wherein the global order buffer module (202), the linked-list managing module (204) and the priority tracker module (206) are configured in a router,
 wherein the flits are from different ingress and comprise different default and elevated weight, and
 wherein the system (200) utilizes deficit interleaved weighted round-robin arbitration.

7. The system (200) for network-on-chip arbitration as claimed in claim 6, wherein the system (200) further comprises a tracker module (208) configured in a node for ensuring the flits of a same transaction ordering are send through the same virtual channels regardless of the priority level.

\* \* \* \* \*